(12) United States Patent
Yamaguchi

(10) Patent No.: US 11,144,166 B2
(45) Date of Patent: Oct. 12, 2021

(54) DISPLAY DEVICE WITH ELECTROSTATIC CAPACITIVE TOUCH PANEL

(71) Applicant: SEIKO EPSON CORPORATION, Tokyo (JP)

(72) Inventor: Yoshiyuki Yamaguchi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/034,005

(22) Filed: Sep. 28, 2020

(65) Prior Publication Data
US 2021/0096672 A1    Apr. 1, 2021

(30) Foreign Application Priority Data
Sep. 30, 2019   (JP) .............................. JP2019-179378

(51) Int. Cl.
*G06F 3/044*    (2006.01)
*G06F 3/041*    (2006.01)

(52) U.S. Cl.
CPC ............ *G06F 3/044* (2013.01); *G06F 3/0412* (2013.01); *G06F 3/0416* (2013.01)

(58) Field of Classification Search
CPC ....... G06F 3/044; G06F 3/0412; G06F 3/0416
See application file for complete search history.

(56) References Cited

U.S. PATENT DOCUMENTS

2015/0338943 A1*  11/2015  Donnelly ............ G06F 3/04162
                                                       345/173

FOREIGN PATENT DOCUMENTS

JP         2015-122631 A       7/2015

\* cited by examiner

*Primary Examiner* — Peter D McLoone
(74) *Attorney, Agent, or Firm* — Global IP Counselors, LLP

(57) ABSTRACT

Provided is a display device with an electrostatic capacitive touch panel including a display panel, the electrostatic capacitive touch panel, a circuit substrate provided with a control circuit that controls the display panel and the electrostatic capacitive touch panel, and a supporting member supporting the electrostatic capacitive touch panel, in which the electrostatic capacitive touch panel includes a sensor film having a first surface and a second surface on a side opposite to the first surface and detecting a contact with the electrostatic capacitive touch panel, and a cover glass protecting the first surface of the sensor film in a first area, which is a partial area in an area where the sensor film is present when viewed from a direction perpendicular to the first surface, and the supporting member is fixed to the first surface in a second area, which is an area outside the first area in the area where the sensor film is present when viewed in the direction perpendicular to the first surface.

12 Claims, 6 Drawing Sheets

DISPLAY DEVICE WITH ELECTROSTATIC CAPACITIVE TOUCH PANEL

The present application is based on, and claims priority from JP Application Serial Number 2019-179378, filed Sep. 30, 2019, the disclosure of which is hereby incorporated by reference here in its entirety.

BACKGROUND

1. Technical Field

The present disclosure relates to a display device with an electrostatic capacitive touch panel.

2. Related Art

In the related art, a display device with an electrostatic capacitive touch panel has been proposed. In general, the display device with the electrostatic capacitive touch panel includes a display panel that displays an image on a display surface, an electrostatic capacitive touch panel that detects a contact, and a circuit substrate that is provided with a control circuit that controls the display panel and the electrostatic capacitive touch panel. Among them, the electrostatic capacitive touch panel includes a sensor film that detects a contact with the electrostatic capacitive touch panel and a cover glass that is provided so as to cover the entire sensor film when viewed from a direction perpendicular to the display surface and protects the sensor film (for example, see JP-A-2015-122631).

In the display device with the electrostatic capacitive touch panel in the related art, when viewed from a direction perpendicular to the display surface, the sensor film is provided only in a part of the area in the area where the cover glass is present. Therefore, there is a possibility that a static electricity generated when an object such as a finger contacts the cover glass may reach the circuit substrate via an outer edge of the sensor film and cause a malfunction in the control circuit provided on the circuit substrate.

SUMMARY

According to an aspect of the present disclosure, to solve the above problem, there is provided a display device with an electrostatic capacitive touch panel including a display panel, an electrostatic capacitive touch panel, a circuit substrate provided with a control circuit that controls the display panel and the electrostatic capacitive touch panel, and a supporting member supporting the electrostatic capacitive touch panel, in which the electrostatic capacitive touch panel includes a sensor film having a first surface and a second surface on a side opposite to the first surface and detecting a contact with the electrostatic capacitive touch panel, and a cover glass protecting the first surface of the sensor film in a first area, which is a partial area in an area where the sensor film is present when viewed from a direction perpendicular to the first surface, and the supporting member is fixed to the first surface in a second area, which is an area outside the first area in the area where the sensor film is present when viewed in the direction perpendicular to the first surface.

DESCRIPTION OF EXEMPLARY EMBODIMENTS

Hereinafter, an embodiment for carrying out the present disclosure will be described with reference to the drawings. However, in each drawing, the size and scale of each part are appropriately different from the actual ones. Further, the embodiment described below is a desired specific example of the present disclosure, so various technically desirable limitations are attached, but the scope of the present disclosure is not limited to these forms unless otherwise specified in the following description.

A. EMBODIMENT

In the present embodiment, a display device with an electrostatic capacitive touch panel will be described by exemplifying a tablet terminal 1.

1. Overview of Tablet Terminal

Hereinafter, the overview of the tablet terminal 1 according to the present embodiment will be described with reference to FIGS. 1 to 3.

Figure 1:
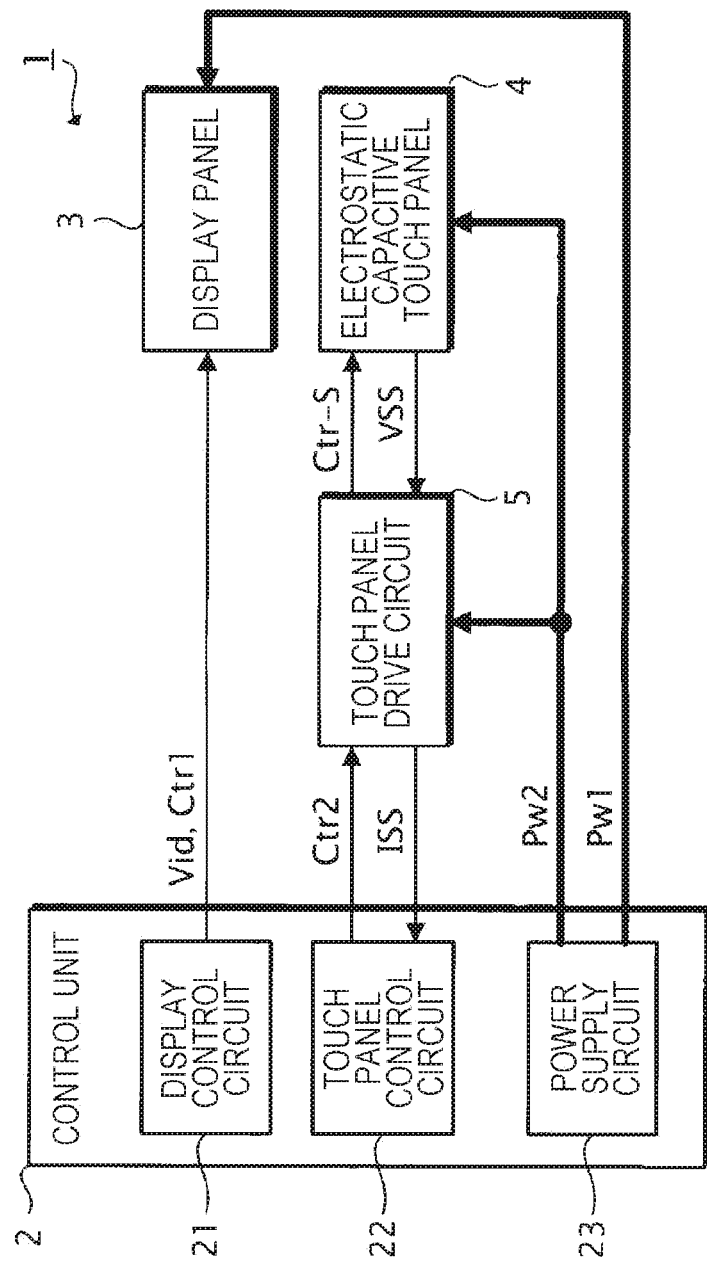
FIG. 1 is a block diagram illustrating an example of a configuration of a tablet terminal according to an embodiment of the present disclosure.

FIG. 1 is a functional block diagram illustrating an example of a functional configuration of the tablet terminal 1.

As illustrated in FIG. 1, the tablet terminal 1 includes a control unit 2, a display panel 3, an electrostatic capacitive touch panel 4, and a touch panel drive circuit 5.

The control unit 2 includes a display control circuit 21 that controls the display panel 3, a touch panel control circuit 22 that controls the electrostatic capacitive touch panel 4, and a power supply circuit 23 that supplies electric power to the display panel 3, the electrostatic capacitive touch panel 4, and the touch panel drive circuit 5. In the following, the display control circuit 21 and the touch panel control circuit 22 may be referred to as "a control circuit".

By supplying a control signal Ctr1 that defines an operation of the display panel 3 and an image signal Vid that indicates an image to be displayed on the display panel 3 to the display panel 3, the display control circuit 21 controls the display panel 3 so that the display panel 3 displays the image indicated by the image signal Vid. In the present embodiment, as an example, it is assumed that the image signal Vid is an analog signal.

By supplying a control signal Ctr2 that defines an operation of the touch panel drive circuit 5 to the touch panel drive circuit 5 that drives the electrostatic capacitive touch panel 4, the touch panel control circuit 22 controls the electrostatic capacitive touch panel 4 via the touch panel drive circuit 5. The touch panel drive circuit 5 generates a control signal Ctr-S for controlling a drive of the electrostatic capacitive touch panel 4 based on the control signal Ctr2, and supplies the generated control signal Ctr-S to the electrostatic capacitive touch panel 4. When the electrostatic capacitive touch panel 4 is driven by the control signal Ctr-S, the electrostatic capacitive touch panel 4 detects a contact of an object Obj such as a finger or a pen on the electrostatic capacitive touch panel 4 and outputs a detection signal VSS indicating the detection result. The touch panel drive circuit 5 generates a contact position signal ISS indicating a contact position of the object Obj with respect to the electrostatic capacitive touch panel 4 based on the detection signal VSS, and outputs the generated contact position signal ISS to the touch panel control circuit 22.

The power supply circuit 23 supplies a drive voltage Pw1 for driving the display panel 3 to the display panel 3, and supplies a drive voltage Pw2 for driving the electrostatic capacitive touch panel 4 and the touch panel drive circuit 5 to the electrostatic capacitive touch panel 4 and the touch panel drive circuit 5. In the present embodiment, the drive voltage Pw1 is higher than the drive voltage Pw2.

Figure 2:
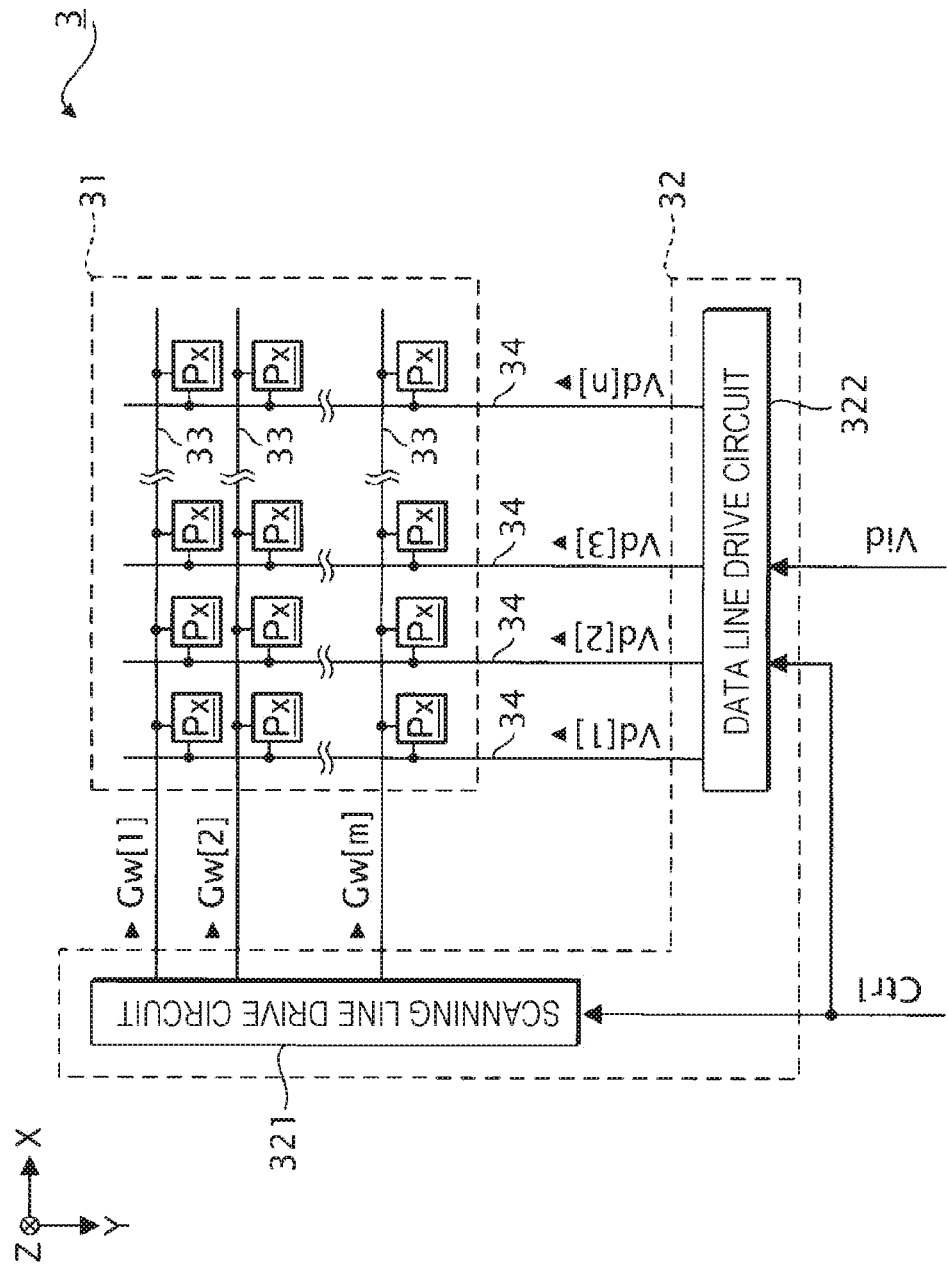
FIG. 2 is a block diagram illustrating an example of a configuration of a display panel.

FIG. 2 is a block diagram illustrating an example of a configuration of the display panel 3.

As illustrated in FIG. 2, the display panel 3 includes a display portion 31 provided with a plurality of pixels Px, and a drive circuit 32 that drives the display portion 31.

Among them, the display portion 31 includes M rows of scanning lines 33 that extend in the +X direction, N columns of data lines 34 that extend in the +Y direction, and (M×N) pixels Px that correspond to (M×N) intersections between the M rows of scanning lines 33 and N columns of data lines 34 and that are arranged in a matrix of N columns in the +X direction and M rows in the +Y direction.

In the present embodiment, as an example, it is assumed that the value M is a natural number that satisfies M≥270 and the value N is a natural number that satisfies N≥480. Further, in the present embodiment, as an example, it is assumed that the display portion 31 has a size of 4.3 inches or more. However, the present disclosure is not limited to such an aspect, and the value M may be at least a natural number that satisfies M≥200, and the value N may be at least a natural number that satisfies N≥300. The display portion 31 may have a size of at least 4 inches or more.

The +Y direction is a direction intersecting the +X direction. Hereinafter, the direction orthogonal to the +X direction and the +Y direction is referred to as the +Z direction. Further, hereinafter, the opposite direction of the +X direction is referred to as the −X direction, the opposite direction of the +Y direction is referred to as the −Y direction, and the opposite direction of the +Z direction is referred to as the −Z direction. In the following, the +X direction and the −X direction may be collectively referred to as the X axis direction, the +Y direction and the −Y direction may be collectively referred to as the Y axis direction, and the +Z direction and the −Z direction may be collectively referred to as the Z axis direction. In the present embodiment, the case where the X axis direction and the Y axis direction are orthogonal to each other is assumed as an example.

The drive circuit 32 includes a scanning line drive circuit 321 and a data line drive circuit 322.

The scanning line drive circuit 321 generates a selection signal Gw[m] for selecting a scanning line 33 at the m-th row based on the control signal Ctr1. The scanning line drive circuit 321 outputs the selection signal Gw[m] in the m-th horizontal scanning period of the M horizontal scanning periods included in a frame period defined by the control signal Ctr1. Accordingly, the scanning line drive circuit 321 can sequentially select the scanning lines 33 at the first row to the M-th row in the frame period. The variable m is a natural number that satisfies 1≤m≤M.

The data line drive circuit 322 generates a gradation designating signal Vd[n] designating a gradation to be displayed in the pixels Px based on the image signal Vid, and outputs the generated gradation designating signal Vd[n] to the data line 34 at the n-th column in the m-th horizontal scanning period in which the scanning line 33 at the m-th row is selected by the scanning line drive circuit 321. The variable n is a natural number that satisfies 1≤n≤N. Further, in the present embodiment, the image signal Vid is a signal including the gradation designating signals Vd[1] to Vd[N].

As described above, the drive circuit 32 outputs the selection signal Gw[m] for selecting the scanning line 33 at the m-th row in the m-th horizontal scanning period, and outputs the gradation designating signal Vd[n] to the data line 34 at the n-th column. Thereby, the drive circuit 32 can display a gradation designated by the gradation designating signal Vd[n] with respect to the pixel Px at the m-th row and the n-th column. In this way, the display panel 3 can display an image corresponding to the image signal Vid on a surface at the −Z side of the display portion 31. The surface at the −Z side of the display portion 31 is an example of "a display surface".

Although details will be described later, the electrostatic capacitive touch panel 4 includes a sensor film 40 that detects a contact of the object Obj on the electrostatic capacitive touch panel 4 and a cover glass 400 that protects the sensor film 42.

Figure 3:
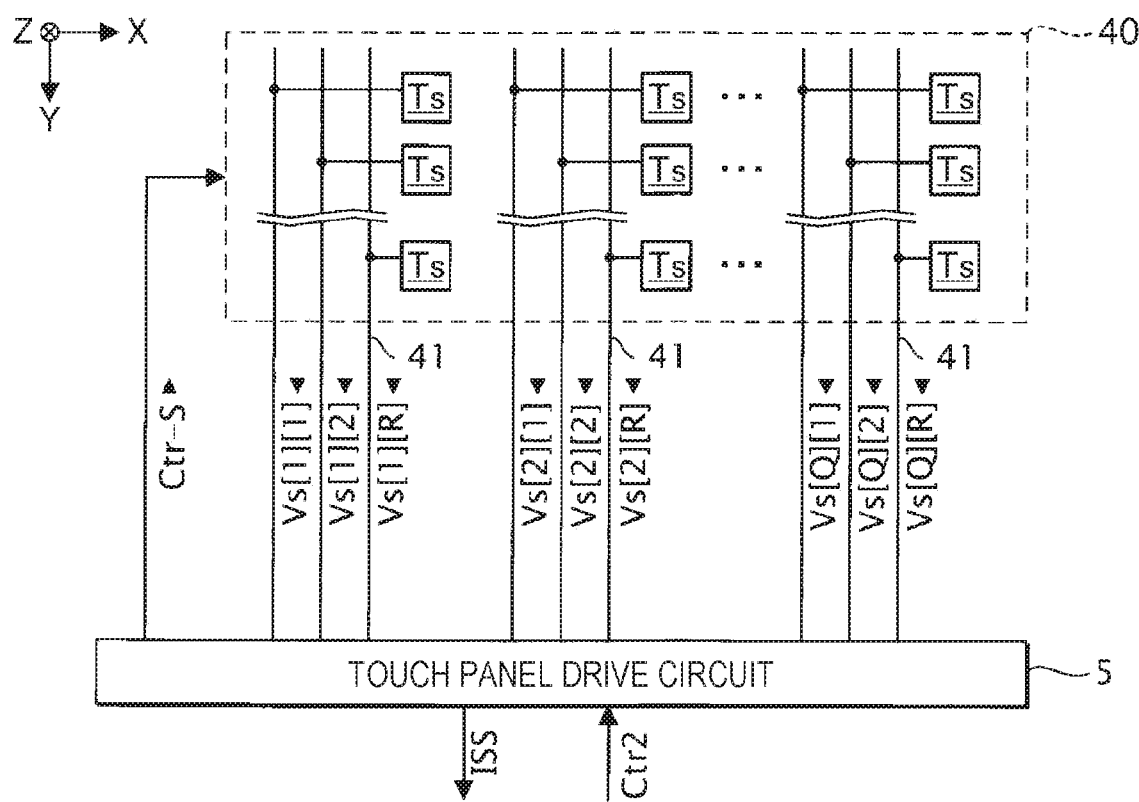
FIG. 3 is a block diagram illustrating an example of a configuration of an electrostatic capacitive touch panel.

FIG. 3 is a block diagram illustrating an example of a configuration of the sensor film 40 and the touch panel drive circuit 5.

As illustrated in FIG. 3, the sensor film 40 includes (Q×R) touch sensors Ts arranged in a matrix of Q columns in the +X direction and R rows in the +Y direction, and (Q×R) detection lines 41 corresponding to (Q×R) touch sensors Ts one-to-one. In the present embodiment, as an example, it is assumed that the value Q is a natural number that satisfies Q≥11 and the value R is a natural number that satisfies R≥19. However, the present disclosure is not limited to such an aspect, and the values Q and R may be natural numbers that at least satisfy "(Q×R)≥200".

The touch sensor Ts has a capacitive element. When an object Obj contacts the electrostatic capacitive touch panel 4, for example, potentials of the two electrodes included in the capacitive element provided in the touch sensor Ts fluctuate.

The touch panel drive circuit 5 generates a control signal Ctr-S based on the control signal Ctr2, and outputs the generated control signal Ctr-S to the electrostatic capacitive touch panel 4. The control signal Ctr-S is a signal for instructing a touch sensor Ts[Q][R] at the q-th row and the r-th column to output a detection signal Vs[Q][R] indicating a potential of one of the two electrodes included in the touch sensor Ts[Q][R] to the detection line 41 that is provided corresponding to the touch sensor Ts[Q][R]. Thereby, the touch panel drive circuit 5 can receive the supply of the (Q×R) detection signals Vs from the (Q×R) touch sensors Ts. The detection signal VSS described above is, for example, a signal including (Q×R) detection signals Vs. The touch panel drive circuit 5 generates the contact position signal ISS based on the (Q×R) detection signals Vs included in the detection signal VSS, and outputs the generated contact position signal ISS to the control unit 2.

In the present embodiment, as an example, it is assumed that the touch panel drive circuit 5 drives the electrostatic capacitive touch panel 4 so that the detection signal Vs is output 100 times or more per second from each touch sensor Ts. However, the present disclosure is not limited to such an aspect, and the touch panel drive circuit 5 only needs to be able to drive the electrostatic capacitive touch panel 4 so that the detection signal Vs is output 90 times or more per second from each touch sensor Ts.

2. Structure of Tablet Terminal

Hereinafter, the structure of the tablet terminal 1 will be described with reference to FIG. 4.

Figure 4:
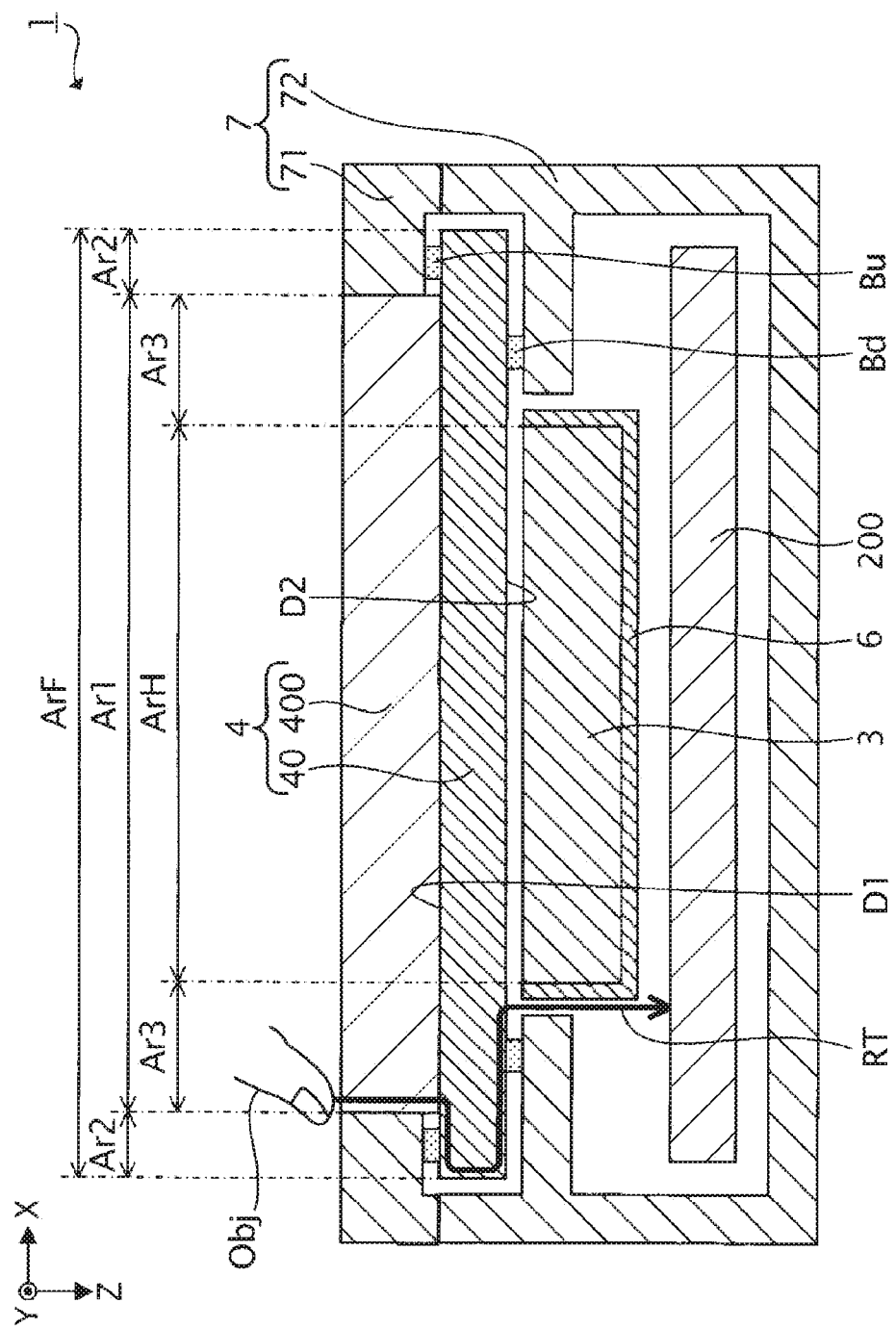
FIG. 4 is a cross-sectional view illustrating an example of a schematic structure of the tablet terminal.

FIG. 4 is a cross-sectional view for explaining an example of the structure of the tablet terminal 1.

As illustrated in FIG. 4, the tablet terminal 1 includes a metal frame 6 and an exterior member 7, in addition to the control unit 2, the display panel 3, the electrostatic capacitive touch panel 4, and the touch panel drive circuit 5 described above. Among them, the exterior member 7 includes an upper side exterior member 71 and a lower side exterior member 72 provided more on the +Z side than the upper side exterior member 71. The control unit 2 also includes a control substrate 200 provided with a display control circuit 21, a touch panel control circuit 22, and a power supply circuit 23.

As illustrated in FIG. 4, the control unit 2 including the control substrate 200, the display panel 3 provided more on the −Z side than the control substrate 200, and the metal frame 6 provided between the control unit 2 and the display panel 3 are accommodated in the lower side exterior member 72. Further, the sensor film 40 is provided on the −Z side of the display panel 3.

As illustrated in FIG. 4, the sensor film 40 has an upper side surface D1 which is a surface on the −Z side of the sensor film 40 and a lower side surface D2 which is a surface on the +Z side of the sensor film 40, that is, a surface opposite to the upper side surface D1. The cover glass 400 and the upper side exterior member 71 are provided on the −Z side of the sensor film 40.

An area where the sensor film 40 is present when the sensor film 40 is viewed from the Z axis direction perpendicular to the upper side surface D1 of the sensor film 40, is referred to as a film presence area ArF. Further, an area where the display panel 3 is present when the display panel 3 is viewed from the Z axis direction perpendicular to the display surface of the display panel 3, is referred to as a display panel presence area ArH. In the present embodiment, as an example, as illustrated in FIG. 4, it is assumed that the display panel presence area ArH is a partial area in the film presence area ArF.

In the present embodiment, as illustrated in FIG. 4, when viewed from the Z axis direction, the cover glass 400 is provided on the −Z side of the upper side surface D1 so as to protect the upper side surface D1 in a central area Ar1, which is an area including the entire display panel presence area ArH and a partial area in the film presence area ArF. Further, when viewed from the Z axis direction, the upper side exterior member 71 is provided on the −Z side of the upper side surface D1 so as to protect the upper side surface D1 in an outer edge area Ar2, which is an area other than the central area Ar1 in the film presence area ArF. The cover glass 400 is provided so as to be present only in the central area Ar1 and not to be present in the outer edge area Ar2 when viewed from the Z axis direction.

The upper side exterior member 71 is fixed to the upper side surface D1 of the sensor film 40 in the outer edge area Ar2. Specifically, as illustrated in FIG. 4, the upper side exterior member 71 is bonded to the upper side surface D1 of the sensor film 40 with the adhesive Bu in the outer edge area Ar2. Further, the lower side exterior member 72 is fixed to the lower side surface D2 of the sensor film 40 in a non-display area Ar3, which is an area other than the display panel presence area ArH in the central area Ar1 when viewed from the Z axis direction. Specifically, as illustrated in FIG. 4, the lower side exterior member 72 is bonded to the lower side surface D2 of the sensor film 40 with the adhesive Bd in the non-display area Ar3. That is, the sensor film 40 is provided between the upper side exterior member 71 and the lower side exterior member 72 in the outer edge area Ar2.

The detection line 41 provided on the sensor film 40 is formed as a transparent wiring by a transparent conductor such as ITO in the central area Ar1, and is formed as a non-transparent wiring by a non-transparent conductor such as magnesium or iron in the outer edge area Ar2. ITO is an abbreviation for Indium Tin Oxide. The detection line 41 formed as a transparent wiring is an example of "a first wiring". Further, the detection line 41 formed as a non-transparent wiring is an example of "a second wiring". In the present embodiment, the transparent wiring is, for example, a wiring to which the detection signal Vs output from the touch sensor Ts is supplied, and the non-transparent wiring is, for example, a wiring for transmitting the detection signal Vs supplied to the transparent wiring to the control substrate 200.

3. Comparative Example

Hereinafter, in order to clarify the effect of the present embodiment, the structure of a tablet terminal 1z according to a comparative example will be described with reference to FIG. 5.

Figure 5:
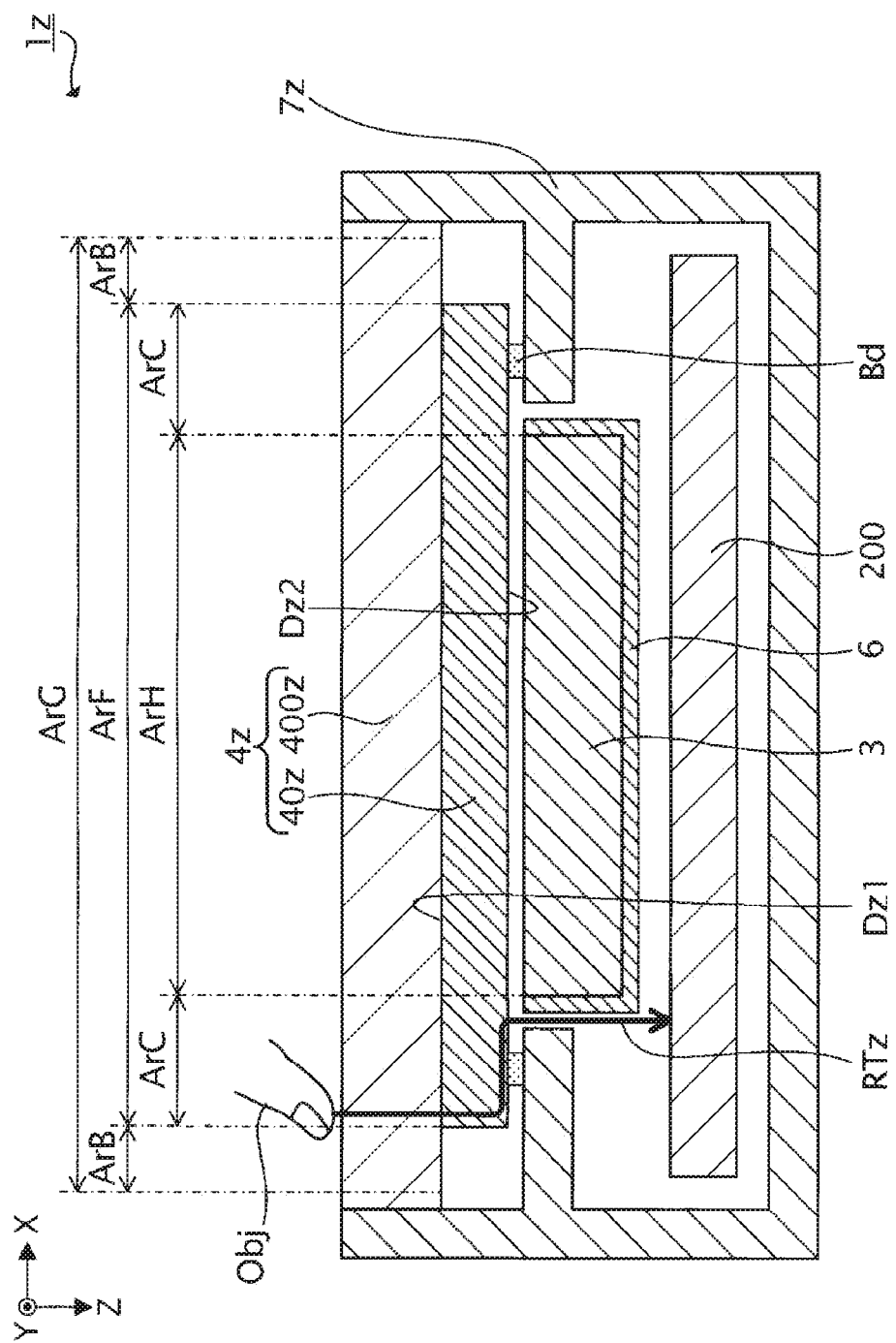
FIG. 5 is a cross-sectional view illustrating an example of a schematic structure of the tablet terminal according to a comparative example.

FIG. 5 is a cross-sectional view for explaining an example of the structure of the tablet terminal 1z according to the comparative example.

As illustrated in FIG. 5, the tablet terminal 1z is different from the tablet terminal 1 according to the embodiment in that an electrostatic capacitive touch panel 4z is provided instead of the electrostatic capacitive touch panel 4, and in that an exterior member 7z is provided instead of the exterior member 7. Among them, the electrostatic capacitive touch panel 4z is different from the electrostatic capacitive touch panel 4 according to the embodiment in that the sensor film 40z is provided instead of the sensor film 40 and the cover glass 400z is provided instead of the cover glass 400. The sensor film 40z has an upper side surface Dz1 that is a surface on the −Z side of the sensor film 40z and a lower side surface Dz2 that is a surface on the +Z side of the sensor film 40z. A cover glass 400z is provided on the −Z side of the sensor film 40z.

Similarly to the tablet terminal 1 according to the embodiment, in the tablet terminal 1z according to the comparative example, when viewed from the Z axis direction, the sensor film 40z is present in the film presence area ArF, and the display panel 3 is present in the display panel presence area ArH. However, in the tablet terminal 1z according to the comparative example, when viewed from the Z axis direction, the cover glass 400z is provided in the cover glass presence area ArG, which is an area that includes the film presence area ArF and is wider than the film presence area ArF. In the following description, an area excluding the film presence area ArF in the cover glass presence area ArG is referred to as a non-film area ArB, and an area excluding the display panel presence area ArH in the film presence area ArF is referred to as a non-display area ArC.

In the tablet terminal 1z according to the comparative example, the exterior member 7z is bonded to the lower side surface Dz2 included in the sensor film 40z with the adhesive Bd in the non-display area ArC.

As illustrated in FIG. 5, in the tablet terminal 1z according to the comparative example, the static electricity is generated when the object Obj such as a finger contacts the surface of the cover glass 400z included in the electrostatic capacitive touch panel 4z on the −Z side. The static electricity generated on the surface of the cover glass 400z at the −Z side reaches the control substrate 200 through a route RTz passing through the outer edge of the sensor film 40z in the X axis direction or the Y axis direction. Therefore, in the tablet terminal 1z according to the comparative example, there are cases where malfunctions occur in various circuits provided on the control substrate 200 due to the static electricity generated by the contact of the object Obj on the cover glass 400z.

In contrast to this, as illustrated in FIG. 4, also in the tablet terminal 1 according to the embodiment, there is a possibility that the static electricity, which is generated when the object Obj such as a finger contacts the surface of the cover glass 400 included in the electrostatic capacitive touch panel 4 on the −Z side, reaches the control substrate 200 through the route RT passing through the outer edge of the sensor film 40 in the X axis direction or the Y axis direction. However, in the present embodiment, as compared with the route RTz through which the static electricity passes through in the comparative example, the route length of the route RT, through which the static electricity passes, is lengthened by an amount corresponding to the route present at a part present in the outer edge area Ar2 of the upper side surface D1 and the lower side surface D2 of the sensor film 40. Therefore, according to the present embodiment, as compared with the comparative example, it is possible to reduce the possibility that the static electricity generated due to the contact of the object Obj on the cover glass 400 reaches the control substrate 200, and further, even when the static electricity generated due to the contact of the object Obj on the cover glass 400 reaches the control substrate 200, the influence of the static electricity on the control substrate 200 can be weakened.

Further, in the tablet terminal 1 according to the embodiment, the cover glass 400 is provided in the central area Ar1 that is narrower than the film presence area ArF by the outer edge area Ar2. Therefore, according to the present embodiment, as compared with the comparative example in which the cover glass 400z is provided in the cover glass presence area ArG, which is wider than the film presence area ArF by the non-film area ArB, the cost for the cover glass can be reduced by the amount of the non-film area ArB and the outer edge area Ar2.

4. Round-Up of Embodiment

As described above, the tablet terminal 1 according to the present embodiment includes the display panel 3, the electrostatic capacitive touch panel 4, the control substrate 200 provided with the control circuit that controls the display panel 3 and the electrostatic capacitive touch panel 4, and the exterior member 7 that supports the electrostatic capacitive touch panel 4. The electrostatic capacitive touch panel 4 includes the sensor film 40 that has the upper side surface D1 and the lower side surface D2 opposite to the upper side surface D1 and detects a contact with the electrostatic capacitive touch panel 4, and a cover glass 400 that protects the upper side surface D1 of the sensor film 40 in the central area Ar1 which is a partial area in the film presence area ArF in which the sensor film 40 is present when viewed from a direction perpendicular to the upper side surface D1. Further, the exterior member 7 is fixed to the upper side surface D1 in the outer edge area Ar2 which is an area outside the central area Ar1 in the film presence area ArF in which the sensor film 40 is present when viewed from a direction perpendicular to the upper side surface D1.

As described above, in this embodiment, when viewed from the direction perpendicular to the upper side surface D1 of the sensor film 40, the cover glass 400 is provided only in a part of the area in the film presence area ArF in which the sensor film 40 is present. That is, in the present embodiment, when viewed from the direction perpendicular to the upper side surface D1, the sensor film 40 is provided in the film presence area ArF which is wider than the central area Ar1 in which the cover glass 400 is present. Therefore, in the present embodiment, as compared with the case, as in the related art, where the sensor film 40 is provided in an area narrower than the film presence area ArF in which the cover glass is present when viewed from the direction perpendicular to the upper side surface D1, the route length of the route RT through which the static electricity, which is generated when the object Obj contacts the cover glass 400, reaches the control substrate 200 via the outer edge of the sensor film 40 can be lengthened. Therefore, in the present embodiment, it is possible to reduce the possibility that a malfunction occurs in the control circuit provided on the control substrate 200 due to the static electricity generated when the object Obj contacts the cover glass 400.

In the present embodiment, the tablet terminal 1 is an example of "a display device with an electrostatic capacitive touch panel", the control substrate 200 is an example of "a circuit substrate", the exterior member 7 is an example of "a supporting member", the upper side surface D1 is an example of "a first surface", the lower side surface D2 is an example of "a second surface", the film presence area ArF is an example of "an area where a sensor film is present", the central area. Ar1 is an example of "a first area", and the outer edge area Ar2 is an example of "a second area".

Further, in the tablet terminal 1 according to the present embodiment, the cover glass 400 is provided so as to be present in the central area Ar1 and not to be present in the outer edge area Ar2 when viewed from the direction perpendicular to the upper side surface D1.s Therefore, in the present embodiment, the cost of the cover glass 400 can be reduced as compared with the case where the cover glass 400 is provided in the central area Ar1 and the outer edge area Ar2.

In the tablet terminal 1 according to the present embodiment, the sensor film 40 includes the touch sensor Ts that detects a contact with the electrostatic capacitive touch panel 4, and the detection line 41 to which the detection signal Vs output from the touch sensor Ts is supplied. Further, the detection line 41 includes a transparent first wiring that is provided in the central area Ar1 and is supplied with the detection signal Vs from the touch sensor Ts, and a non-transparent second wiring that is provided in the outer edge area Ar2 and transmits the detection signal Vs supplied to the first wiring to the control substrate 200.

Therefore, in the present embodiment, when a user of the tablet terminal 1 views the display panel 3 via the electrostatic capacitive touch panel 4, it is possible to prevent the visibility of the display panel 3 from being lowered due to the presence of the detection line 41.

In the present embodiment, the detection signal Vs is an example of "an output signal".

Further, in the tablet terminal 1 according to this embodiment, the exterior member 7 is bonded to the upper side surface D1 with the adhesive Bu in the outer edge area Ar2.

Therefore, in the present embodiment, it is possible to reduce the cost for manufacturing the tablet terminal 1 as compared with a case where the exterior member 7 and the electrostatic capacitive touch panel 4 are fixed by a fixing tool such as a screw.

Further, in the tablet terminal 1 according to the present embodiment, the exterior member 7 is fixed to the lower side surface D2 in the non-display area Ar3, which is an area outside the display panel presence area ArH in which the display panel 3 is present, in the central area Ar1, when viewed from the direction perpendicular to the upper side surface D1.

Therefore, in the present embodiment, the strength of the tablet terminal 1 can be increased as compared with the case where the exterior member 7 and the electrostatic capacitive touch panel 4 are fixed only on the upper side surface D1.

In the present embodiment, the display panel presence area ArH is an example of "an area where a display panel is present", and the non-display area Ar3 is an example of "a third area".

Further, in the tablet terminal 1 according to this embodiment, the exterior member 7 is bonded to the lower side surface D2 with the adhesive Bd in the non-display area Ar3.

Therefore, in the present embodiment, it is possible to reduce the cost for manufacturing the tablet terminal 1 as compared with a case where the exterior member 7 and the electrostatic capacitive touch panel 4 are fixed by a fixing tool such as a screw.

Further, in the tablet terminal 1 according to the present embodiment, the exterior member 7 includes the upper side exterior member 71 fixed to the upper side surface D1 and the lower side exterior member 72 fixed to the lower side surface D2, and in the outer edge area Ar2, the sensor film 40 is provided between the upper side exterior member 71 and the lower side exterior member 72.

Therefore, in this embodiment, the sensor film 40 can be fixed by the upper side exterior member 71 and the lower side exterior member 72, and, for example, the strength of the tablet terminal 1 can be increased as compared with the case where the sensor film 40 is fixed by one of the upper side exterior member 71 and the lower side exterior member 72.

In the present embodiment, the upper side exterior member 71 is an example of "a first member" and the lower side exterior member 72 is an example of "a second member".

Further, the tablet terminal 1 according to the present embodiment includes a metal frame 6 provided between the display panel 3 and the control substrate 200.

Therefore, in the present embodiment, as compared with the case where the metal frame 6 is not provided, since the noise from the display panel 3 can be suppressed from propagating to the control substrate 200 and the noise from the control substrate 200 can be suppressed from propagating to the display panel 3, it is possible to suppress the occurrence of a malfunction in the tablet terminal 1 due to various noises.

Further, in the tablet terminal 1 according to the present embodiment, the display panel 3 has 300 or more pixels Px arranged in the X axis direction and 200 or more pixels Px arranged in the Y axis direction intersecting the X axis direction.

As described above, in the present embodiment, the cost of the cover glass 400 can be reduced as compared with the case where the cover glass 400 is provided in the central area Ar1 and the outer edge area Ar2. As the number of pixels Px arranged on the display panel 3 increases, the cost reduction range of the cover glass 400 also increases. Therefore, according to the present embodiment, for example, as compared with a case where less than 300 pixels Px are arranged in the X axis direction and less than 200 pixels Px are arranged in the Y axis direction, the cost reduction effect of the cover glass 400 can be increased.

In the present embodiment, the X axis direction is an example of "a first direction" and the Y axis direction is an example of "a second direction".

Further, in the tablet terminal 1 according to the present embodiment, the display panel 3 has a size of 4 inches or more.

As described above, in the present embodiment, the cost of the cover glass 400 can be reduced as compared with the case where the cover glass 400 is provided in the central area Ar1 and the outer edge area Ar2. As the size of the display panel 3 increases, the cost reduction range of the cover glass 400 also increases. Therefore, according to the present embodiment, it is possible to increase the cost reduction effect of the cover glass 400 as compared with, for example, a case where the size of the display panel 3 is less than 4 inches.

Further, in the tablet terminal 1 according to the present embodiment, the electrostatic capacitive touch panel 4 has 200 or more touch sensors Ts.

As described above, in the present embodiment, the cost of the cover glass 400 can be reduced as compared with the case where the cover glass 400 is provided in the central area Ar1 and the outer edge area Ar2. As the number of touch sensors Ts provided on the electrostatic capacitive touch panel 4 increases, the cost reduction range of the cover glass 400 also increases. Therefore, according to the present embodiment, the cost reduction effect on the cover glass 400 may be increased as compared with, for example, a case where the number of the touch sensors Ts provided on the electrostatic capacitive touch panel 4 is less than 200.

Further, in the tablet terminal 1 according to the present embodiment, the touch sensor Ts can detect the presence/absence of a touch on the touch sensor Ts 90 times or more per second.

Therefore, in the present embodiment, for example, the touch sensor Ts can accurately detect a touch on the touch sensor Ts as compared with the case where the presence/absence of the touch on the touch sensor Ts can be detected less than 90 times per second.

B. MODIFICATION EXAMPLES

Each of the above embodiments can be variously modified. Specific aspects of modification will be exemplified below. Two or more aspects selected from the following exemplifications can be appropriately merged within a range not inconsistent with each other. In the modification examples illustrated below, the elements having the same operations and functions as those of the embodiment will be denoted by the reference numerals referred to in the above description, and detailed description thereof will be appropriately omitted.

Modification Example 1

In the embodiment described above, the exterior member 7 is fixed to the lower side surface D2 of the sensor film 40 in the non-display area Ar3, but the present disclosure is not limited to such an aspect. The exterior member 7 may be fixed to the lower side surface D2 of the sensor film 40 in the outer edge area Ar2.

Figure 6:
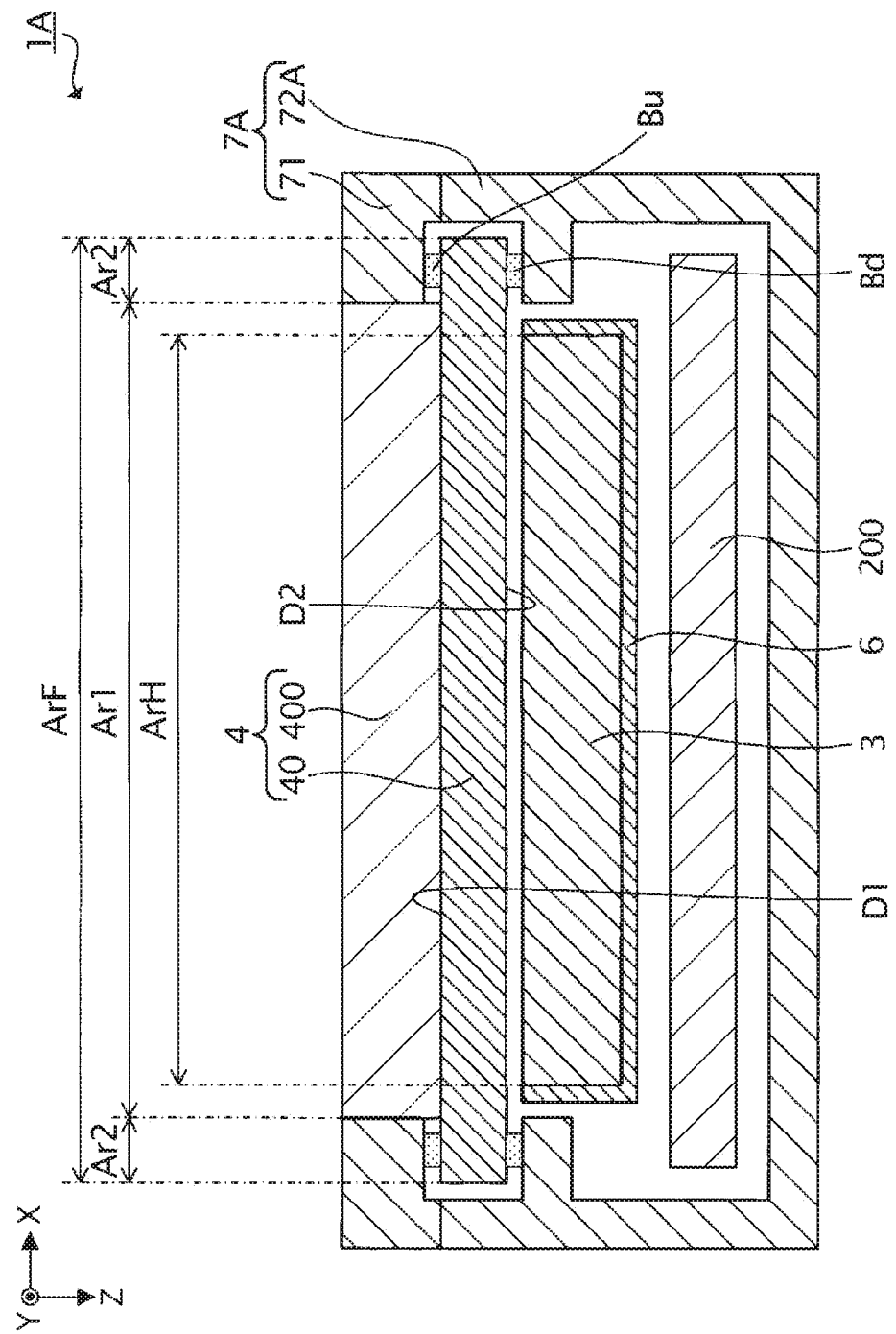
FIG. 6 is a cross-sectional view illustrating an example of a schematic structure of a tablet terminal according to Modification Example 1.

FIG. 6 is a cross-sectional view for explaining an example of the structure of the tablet terminal 1A according to the present modification example.

As illustrated in FIG. 6, the tablet terminal 1A is different from the tablet terminal 1 according to the embodiment in that an exterior member 7A is provided instead of the exterior member 7. The exterior member 7A is different from the exterior member 7 according to the embodiment in that a lower side exterior member 72A is provided instead of the lower side exterior member 72. The lower side exterior member 72A is bonded to the lower side surface D2 of the sensor film 40 with the adhesive Bd in the outer edge area Ar2.

According to the present modification example, since the lower side exterior member 72A is fixed to the lower side surface D2 in the outer edge area Ar2, the display panel presence area ArH can be widened as compared with the case where the lower side exterior member 72 is fixed to the lower side surface D2 in the non-display area Ar3 as described in the embodiment. Therefore, according to the present modification example, as compared with the case where the lower side exterior member 72 is fixed to the lower side surface D2 in the non-display area Ar3 as described in the embodiment, the size of the display panel 3 can be increased without increasing the size of the tablet terminal 1A.

Modification Example 2

In the above-described embodiment and Modification Example 1, a tablet terminal is illustrated as an example of a display device with an electrostatic capacitive touch panel, but the present disclosure is not limited to such an aspect. As the display device with the electrostatic capacitive touch panel, in addition to the tablet terminal, a smartphone, a personal digital assistant, a car navigation device, and any other display device having the electrostatic capacitive touch panel can be adopted.

What is claimed is:

1. A display device with an electrostatic capacitive touch panel comprising:
   a display panel;
   an electrostatic capacitive touch panel;
   a circuit substrate provided with a control circuit that controls the display panel and the electrostatic capacitive touch panel; and
   a supporting member supporting the electrostatic capacitive touch panel, wherein
   the electrostatic capacitive touch panel includes
      a sensor film having a first surface and a second surface on a side opposite to the first surface and detecting a contact with the electrostatic capacitive touch panel, and
      a cover glass protecting the first surface of the sensor film in a first area, which is a partial area in an area where the sensor film is present when viewed from a direction perpendicular to the first surface, and
   the supporting member is fixed to the first surface in a second area, which is an area outside the first area in the area where the sensor film is present when viewed in the direction perpendicular to the first surface.

2. The display device with the electrostatic capacitive touch panel according to claim 1, wherein
   the cover glass is provided such that the cover glass is present in the first area and is not present in the second area when viewed from the direction perpendicular to the first surface.

3. The display device with the electrostatic capacitive touch panel according to claim 1, wherein
   the sensor film includes
      a touch sensor which detects a contact with the electrostatic capacitive touch panel,
      a transparent first wiring which is provided in the first area, and to which an output signal output from the touch sensor is supplied, and
      a non-transparent second wiring which is provided in the second area, and transmits the output signal supplied to the first wiring to the circuit substrate.

4. The display device with the electrostatic capacitive touch panel according to claim 1, wherein
   the supporting member is bonded to the first surface with an adhesive in the second area.

5. The display device with the electrostatic capacitive touch panel according to claim 1, wherein
   the supporting member is fixed to the second surface in a third area, which is an area outside an area where the display panel is present in the first area when viewed in the direction perpendicular to the first surface.

6. The display device with the electrostatic capacitive touch panel according to claim 5, wherein
   the supporting member is bonded to the second surface with an adhesive in the third area.

7. The display device with the electrostatic capacitive touch panel according to claim 1, wherein
   the supporting member includes
      a first member fixed to the first surface, and
      a second member fixed to the second surface, and
   in the second area, the sensor film is provided between the first member and the second member.

8. The display device with the electrostatic capacitive touch panel according to claim 1, further comprising:
   a metal frame provided between the display panel and the circuit substrate.

9. The display device with the electrostatic capacitive touch panel according to claim 1, wherein
   the display panel has
      300 or more pixels arranged in a first direction, and
      200 or more pixels arranged in a second direction intersecting the first direction.

10. The display device with the electrostatic capacitive touch panel according to claim 1, wherein
    the display panel has a size of 4 inches or more.

11. The display device with the electrostatic capacitive touch panel according to claim 1, wherein
    the electrostatic capacitive touch panel has 200 or more touch sensors.

12. The display device with the electrostatic capacitive touch panel according to claim 1, wherein
    the touch sensor provided in the electrostatic capacitive touch panel is configured to detect a presence/absence of a touch on the touch sensor 90 times or more per second.

* * * * *